US006546832B2

(12) United States Patent
Greenwald et al.

(10) Patent No.: US 6,546,832 B2
(45) Date of Patent: Apr. 15, 2003

(54) BRAKE LATHE STATION

(75) Inventors: Christopher L. Greenwald, Concord, NH (US); Jeffrey P. Hastings, Hanover, NH (US); Harold O. Yeo, Mississauga (CA); David E. Cox, Jr., Pewaukee, WI (US)

(73) Assignees: Pro-Cut Licensing, LLC, West Lebanon, NH (US); part interest; Wheeltronic Ltd., Mississauga (CA); part interest ( * ) Notice: Subject to any disclaimer, the term of this patent is extended or adjusted under 35 U.S.C. 154(b) by 146 days.

(21) Appl. No.: 09/731,258

(22) Filed: Dec. 6, 2000

(65) Prior Publication Data

US 2002/0066341 A1 Jun. 6, 2002

(51) Int. Cl.⁷ .............................. B23B 5/04; B23B 5/32
(52) U.S. Cl. ........................................... 82/112; 82/128
(58) Field of Search .......................... 82/112, 120, 149, 82/158, 159, 161, 173; 414/611

(56) References Cited

U.S. PATENT DOCUMENTS

| 4,732,186 A | * | 3/1988 | Nishikawa ................... 134/123 |
| 4,781,517 A | * | 11/1988 | Pearce et al. ............... 104/167 |
| 5,222,283 A | * | 6/1993 | Laschet ....................... 29/27 C |
| 5,499,563 A | * | 3/1996 | Hansen ......................... 82/112 |
| 5,549,023 A | * | 8/1996 | Strout et al. .................. 82/112 |
| 5,634,503 A | * | 6/1997 | Musil et al. .............. 137/234.6 |
| 5,937,972 A | * | 8/1999 | Audre ......................... 187/210 |
| 5,954,160 A | * | 9/1999 | Wells et al. ................ 187/203 |
| 6,101,911 A | | 8/2000 | Newell et al. ................. 82/112 |
| 6,279,685 B1 | * | 8/2001 | Kogan et al. ................ 187/203 |
| 2001/0011490 A1 | * | 8/2001 | Vasquez, Jr. .................. 82/112 |
| 2002/0043137 A1 | * | 4/2002 | Yeo et al. ..................... 82/112 |

OTHER PUBLICATIONS

Information obtained on the Internet at URL: http://www.hein–werner. com/WSO/WSO.html.

* cited by examiner

Primary Examiner—A. L. Wellington
Assistant Examiner—Brian D Walsh
(74) Attorney, Agent, or Firm—Michael J. Weins; Jeffrey E. Semprebon (57) ABSTRACT

A brake lathe station has an on-vehicle brake lathe and a lift with support posts for raising a vehicle. A support structure supports the lathe while allowing it to be moved with respect to a horizontal plane about the vehicle to assist the lathe operator in positioning the lathe with respect to wheel hubs of the vehicle. The lathe is preferably connected to the support structure by an adjustable coupling which allows vertically tilting a lathe rotation axis of the lathe, as well as allowing rotation of the lathe substantially about its lathe rotation axis. The lathe can also be moved with respect to a vertical plane. The lathe can be floated with respect to the support structure while the lathe is mounted on the wheel hub. The coupling can be designed to allow attaching a dolly to the lathe while it is still supported by the support structure.

18 Claims, 6 Drawing Sheets

Figure 7

BRAKE LATHE STATION

FIELD OF INVENTION

The present invention relates to a brake lathe station, and more particularly to a station that combines a post supported vehicle lift with an integrated on-vehicle disk brake lathe positioner.

BACKGROUND OF THE INVENTION

There have been a variety of brake lathes developed to reduce or eliminate the lateral run-out of brake disks that can develop when the brakes are in service. There are bench lathes where the brake disk must be removed from the vehicle, caliper lathes that attach to the brake calipers, and on-vehicle lathes where the lathe attaches to a hub associated with the disk to be resurfaced. These lathes, and in particular the on-vehicle lathes, are discussed in U.S. Pat. Nos. 5,974,878; 6,050,160; and 6,101,911.

Classically, the on-vehicle brake lathes are employed in combination with a vehicle lift employing one or more support posts, such as are currently available from a variety of suppliers. These lifts allow the vehicle to be suspended so that its wheels are free to rotate. The wheels are removed and the on-vehicle lathe is attached to a hub from which the wheel has been removed. The hub is affixed with respect to an associated brake disk, and the two share a common axis of rotation. After the on-vehicle lathe is attached to the hub, it is aligned with the hub and the disk such that an axis of rotation of the lathe is substantially coincident with the axis of rotation of the hub and disk. Details of the typical operation of the lathe are further described in the above referenced patents.

The attachment of the on-vehicle lathe with the hub is manually done by the operator who uses a positioning dolly to manually adjust the relative positions of the on-vehicle lathe with respect to the hub. While this procedure works, it requires that the floor space be free from obstructions so that the dolly can be rolled across the floor without encountering obstructions, and also introduces the dolly into a limited space which may hinder other operations. The use of a dolly also requires the operator to move the dolly across the floor and, at the same time, roughly align the on-vehicle lathe with the hub. This can be difficult and requires appreciable force to be applied by the user when the floor is irregular, and also can result in limited control of the response of the dolly to the user's actions.

The problem of locating a tool at or near its in use position by remotely mounting the tool with respect to a stationary post via a series of interconnecting pivoting arms has been classically done in a variety of work stations. Such work stations are frequently used in maintenance employed for repairing vehicles. Similar support and transport systems are also used in dental offices to allow manipulation of instruments such as X-ray cameras. An alternative to using a stationary post for support has been to use a track mounted above the work area having a carriage mounted thereon, which in turn supports and transports a tool about a work space. The above described devices are well suited to allow the tool to be supported as it is brought into position, so that the operator can position the tool accurately without having to also support its weight. Frequently, when rail-guided carriages are used in automotive applications, they are employed in combination with a chain fall suspended therefrom to accommodate changes in the height of the tool, which is suspended in turn from the chain fall.

While these positioning devices have been in use for years, such have not been employed in combination with a lift and an on-vehicle brake lathe, which introduces certain special needs. Thus, there is a need for an on-vehicle lathe station for refinishing disk brakes that eliminates the need for a positioning dolly.

OBJECTS OF THE INVENTION

It is an object of the invention to provide an on-vehicle brake lathe positioning and stabilizing mechanism that does not require a dolly.

It is another object of the invention to provide a on-vehicle brake lathe positioning and stabilizing mechanism which attaches to a lift.

It is still a further object of the invention to provide a removable on-vehicle brake lathe positioning and stabilizing mechanism from which the lathe can be removed for storage or use at a location remote to the lift.

A further object of the invention is to provide a positioning and stabilizing mechanism for an on-vehicle brake lathe which reduces the transmission of vibrations to the on-vehicle brake lathe while countering torque generated by the on-vehicle brake lathe as it turns the hub of a vehicle.

It is another object of the invention to provide a dual coupling for an on-vehicle brake lathe which is configured such that the lathe can be simultaneously attachable to a dolly and to a positioning and stabilizing mechanism, thereby facilitating transfer of the on-vehicle lathe between the dolly and the positioning and stabilizing mechanism.

SUMMARY OF THE INVENTION

The present invention is an improved brake lathe station which uses an on-vehicle brake lathe. Examples of such on vehicle brake lathes are described in U.S. Pat. Nos. 5,974,878; 6,050,160; and 6,101,911. The brake lathe station has a lift with one or more support posts, which in turn have vehicle undercarriage supports that are pivotally connected to the support post and raisable and lowerable thereon. Such lifts are commercially available, and frequently employ two support posts.

The improvement resides in providing a means for positioning the on-vehicle brake lathe with respect to a horizontal plane, hereinafter referred to as "horizontal positioning means". The horizontal positioning means is attached with respect to the one or more support posts of the lift to assist a user in positioning the lathe with respect to a wheel hub for mounting the lathe thereon. The hub has an associated brake disk, and the hub and disk share a common hub axis. To mount the lathe on the hub, the lathe must be positioned such that a lathe rotation axis of the lathe is roughly in line with the hub axis. After mounting, the lathe rotation axis and the hub axis can be effectively aligned by an alignment mechanism which can be an integral part of the lathe, as further discussed in the above referenced patents.

The horizontal positioning means is configured to support the lathe while allowing it to be moved with respect to a horizontal plane to positions in close proximity to each of the hubs. This allows the operator to readily position the on-vehicle lathe with respect to the hubs of the vehicle.

The improved brake lathe station also has a coupling for attaching the on-vehicle brake lathe with respect to the horizontal positioning means. Preferably, this coupling also is designed to prevent rotation of the on-vehicle brake lathe with respect to the hub to which the on-vehicle lathe is mounted. It is also preferred for the coupling to be lockably adjustable to allow the lathe to be rotated about the lathe rotation axis through a wide range of orientations to allow the lathe access to the brake disk and avoid obstruction with other elements of the brake system such as dust shields. Also, it is preferred for the coupling to accommodate tilting. The range of tilt should be such as to allow the lathe rotation axis to be tilted up to about 15 degrees from horizontal. Providing such a range of tilt permits the lathe rotation axis to be aligned with the hub when the hub becomes canted by the suspension of the vehicle when the vehicle is raised off its wheels.

In one preferred embodiment, the horizontal positioning means has a track for transporting the on-vehicle brake lathe. A lathe support carriage slidably engages the track and has a lathe brace attached thereto. The brace in turn is attached to the on-vehicle lathe by the coupling. In one preferred embodiment employing a track, a substantially vertical wand is employed as the brace. It is further preferred for the track to circumscribe the one or more support posts of the lift. When the lift employs multiple support posts, it is preferred for the track to attach to the support posts of the lift.

To facilitate the use of the lathe station with various sizes of vehicles and allow fine adjustment of the lathe position with respect to the hubs, the on-vehicle lathe is preferably mounted with respect to the track so as to provide motion substantially normal to the track. One preferred means for providing motion normal to the track is by having the brace slidably engage the carriage so as to provide a motion in a direction substantially normal to the track.

Another preferred embodiment has horizontal positioning means having at least two lathe supporting arms, which are pivotably attached to each other to allow them to be rotated so as to provide pivotal motion in a substantially horizontal plane. In this embodiment, one of the arms pivots about a point which is fixed with respect to each of the at least one support posts. The other arm is attached to a brace which supports the on-vehicle lathe and which is attached thereto by the coupling. In a further preferred embodiment, the fixed point of the lathe supporting arms resides over one of the support posts. This embodiment is well suited to lifts which employ a single support post.

Another preferred embodiment, which employs a lift having a pair of support posts connected by a stabilizing bar, employs horizontal positioning means having a single lathe supporting arm, which is pivotably mounted to an arm carriage. The arm carriage in turn traverses the stabilizing bar to provide an additional degree of freedom in positioning the lathe. Again, this lathe supporting arm is attached to a lathe brace which in turn is attached to the on-vehicle brake lathe by the coupling.

When one or more lathe supporting arms are employed, it should be noted that a means for rotation of the on-vehicle lathe with respect to the arms about a vertical axis is necessary to allow the lathe to be properly directed with respect to the hub. There are multiple ways in which such rotational freedom can be supplied. For example, the lathe brace can be pivotably mounted to the lathe support arm or the rotational freedom can be provided via the coupling.

The on-vehicle brake lathe must also be positioned with respect to the hub in a vertical plane. The vertical position of the on-vehicle lathe with respect to the hub can be adjusted by repositioning the undercarriage supports with respect to the support posts on which they are mounted. While this approach simplifies the structure of the brake lathe station, adjusting the elevation of the undercarriage supports with precision can be difficult. Thus, it is preferred to provide means for positioning the on-vehicle lathe with respect to a vertical plane independently of the elevation of the vehicle, hereinafter referred to as "vertical positioning means".

When the lathe brace is a wand, the vertical positioning means can be provided by making the wand extendable. The extendable wand can be driven by a variety of devices such as a rack and pinion, a linear actuator, or a jack screw.

In another embodiment, the lathe brace is provided by a pair of lathe height adjusting arms which are disposed between the horizontal positioning means and the on-vehicle brake lathe. The lathe height adjusting arms are configured to pivot about a substantially horizontal axis and, in combination with means for varying the included angle of the lathe height adjusting arms, can provide the vertical positioning means. It is further preferred for the lathe height adjusting arms to be pivotably mounted about a horizontal axis with respect to the horizontal positioning means. This allows the lathe height adjusting arms to provide adjustment of the position of the lathe toward and away from the hub.

It is preferred for the on-vehicle brake lathe to be mounted with respect to the horizontal positioning means such that it can be floatably coupled with respect thereto when the lathe is mounted on the hub. Since the lathe is supported by the hub when it is mounted thereto, it does not require support from the horizontal positioning means until the lathe is to be removed.

Floating the lathe with respect to the horizontal positioning means after the lathe has been mounted to the hub serves to damp vibrations that might otherwise be transmitted to the lathe through the horizontal positioning means and which might adversely affect the machining of the brake disk. When the coupling is designed to prevent rotation of the lathe, the ability to float the lathe should be designed to maintain the ability of the coupling to prevent rotation while the lathe is floated.

When vertical positioning means are employed for adjusting the height of the lathe, floatable coupling of the lathe with respect to the horizontal positioning means can be provided in a variety of ways. When, for example, a rack and pinion mechanism is employed as part of the vertical positioning means, separating the pinion from the rack can serve to decouple these elements and provide a floatable coupling of the lathe with respect to the horizontal positioning means.

In all cases, it is preferred that the coupling that attaches the on-vehicle brake lathe to the lathe brace be a detachable coupling. It is also preferred that a supplemental coupling be provided, to which a dolly can be attached to support and transport the on-vehicle brake lathe. The supplemental coupling allows the lathe to be mounted onto the dolly while still being supported by the horizontal positioning means. The lathe can thus be readily mounted to the dolly, detached from the horizontal positioning means, and removed for use at another station while the vehicle remains on the lift or when it is desired to make the lift of the brake lathe station available to perform other functions.

BRIEF DESCRIPTION OF THE DRAWINGS

FIG. 1 is an isometric view of one embodiment of the present invention which employs a two-post hydraulic lift. The two-post lift shown has a pair of adjustable undercarriage supports. Each adjustable undercarriage support has a pair of support arms that are pivotally mounted with respect to the two posts and can be swung under a vehicle to provide support to lift and support the vehicle. An on-vehicle brake lathe is transported by a track. In the embodiment illustrated, the track is an overhead track which circumscribes the two posts and is also configured to circumscribe the vehicle positioned on the lift. A lathe support carriage slidably engages the track, and in turn is slidably engaged by a wand. The lathe is mounted to the wand by a coupling. The wand and the lathe supporting carriage are configured to allow translation along the track while maintaining the wand in a substantially vertical orientation, while the slidable engagement of the wand and the lathe support carriage allows the position of the wand to be adjusted in a direction normal to the track. The lathe can thus be moved along the length of the track and, to a limited degree, normal to the track so as to be supported as it is moved into position to engage a wheel hub associated with a brake disk to be resurfaced.

FIG. 2 is an isometric view of another embodiment of the present invention, employing a lift with a single support post. In this embodiment, a pair of lathe supporting arms are pivotally connected to each other and with respect to the support post so as to provide rotation in a horizontal plane. A telescoping wand is attached to a free end on one arm, the base end of which is connected to the free end of the other arm, which rotates about a fixed axis which is parallel to the support post of the lift. The telescoping wand is adjustable via a rack and pinion mechanism to adjust the height of the lathe. The lathe is mounted to the telescoping wand by a dual-purpose coupling which allows the on-vehicle lathe to be attached to a wand as well as to a dolly.

FIG. 3 is an enlarged view of the region 3 of FIG. 2, illustrating the rack and pinion mechanism. A pinion gear can be moved to a disengage position, as shown, where the pinion gear is removed from contact with the rack to prevent vibrations from being transmitted through the telescoping wand to the lathe when the lathe is mounted to a hub.

DETAILED DESCRIPTION OF THE INVENTION

Figure 1:
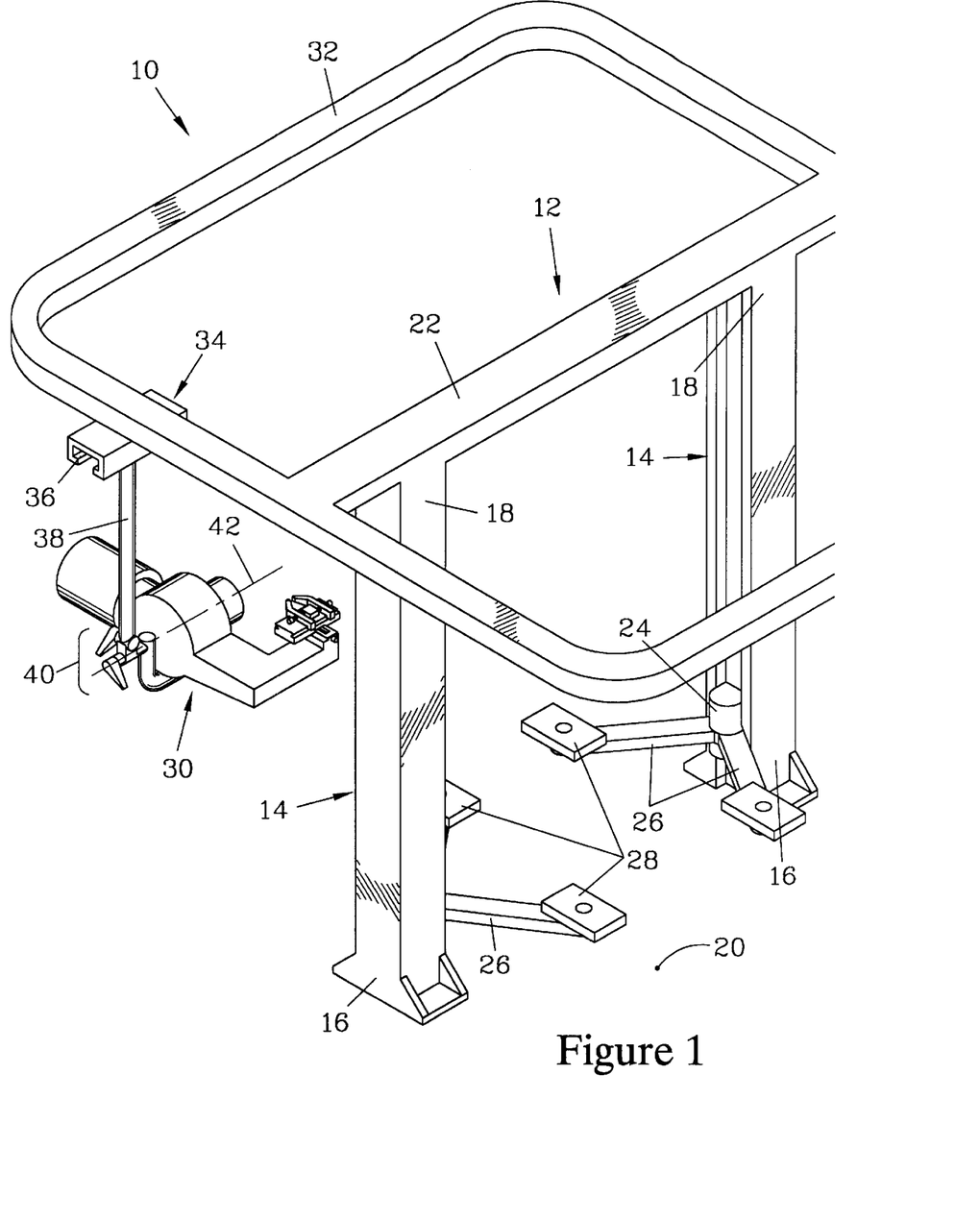

FIG. 1 is an isometric view of one embodiment the present invention, an improved brake lathe station 10. The brake lathe station 10 employs a two-post hydraulic lift 12 such as is known in the art and is commercially available, for example from Rotary Lift, Inc. The lift 12 has a pair of spaced apart vertical support posts 14 having lower ends 16 and upper ends 18. The lower ends 16 are configured to be bolted or otherwise affixed to a floor 20. The upper ends 18 are stabilized in part by a stabilizing bar 22 attached to the upper ends 18 of the support posts 14.

A vehicle support carriage 24 is slidably mounted in each of the support posts 14, and undercarriage support arms 26 are pivotally mounted to each of the vehicle support carriages 24 (only one of which is shown). The undercarriage support arms 26 are fitted with vehicle undercarriage-engaging pads 28 which support a vehicle (not shown) and, in combination with the undercarriage support arms 26, provide undercarriage supports which engage the undercarriage of the vehicle and support the vehicle when the vehicle support carriages 24 are raised. The lift 12 allows raising the vehicle, thereby freeing wheels of the vehicle from contact with the floor 20 and allowing the wheels to be removed to provide access to wheel hubs and associated brake disks which are to be resurfaced.

In the embodiment illustrated in FIG. 1, an on-vehicle brake lathe 30 such as those described in U.S. Pat. Nos. 5,974,878; 6,050,160; and 6,101,911 is provided for machining the brake disk to reduce lateral run-out to acceptable levels. The on-vehicle brake lathe 30 is supported by an overhead track 32 which, in this embodiment, circumscribes the posts 14 and is attached thereto. The track 32 can be either a closed track (as illustrated) or a U-shaped track that allows the on-vehicle brake lathe 30 to be transported from one side of the vehicle to the other allowing all brake disks to be serviced.

A lathe support carriage 34 slidably engages the track 32, and has a transverse path 36 which is substantially normal to the track 32. A substantially vertical wand 38 serves as a lathe brace and is slidably engaged with the lathe support carriage 34. The engagement of the substantially vertical wand 38 with the transverse path 36 and the engagement of the lathe support carriage 34 with the overhead track 32 is designed such that the wand 38 can readily slide with respect to the track 32 and along the transverse path 36, but is stabilized against tilting with respect to the track 32 and the transverse path 36, thereby assuring that the wand 38 remains substantially vertical at all times. The combination of the support track 32, the lathe support carriage 34, and the substantially vertical wand 38 provide the horizontal positioning means for this embodiment.

The on-vehicle brake lathe 30 is attached to the wand 38 via a coupling 40. In this embodiment, the coupling 40 fixably attaches the lathe 30 to the wand 38 to prevent rotation of the on-vehicle brake lathe 30 as a result of torsional loads introduced by tool bits of the lathe 30 as they resurface the brake disk. While the coupling 40 is fixed when the lathe 30 is in operation to prevent rotation, it is preferably adjustable about a lathe rotation axis 42, allowing the lathe 30 to be positioned in a wide range of orientations with respect to the hub to allow the lathe 30 access to the brake disk. Frequently, the brake disk is protected by a dust shield or other structure, and the lathe 30 must be oriented with respect to such structure to provide the tool bits of the lathe 30 access to the brake disk. The coupling 40 is also preferably adjustable to allow the lathe 30 to be tilted such that the lathe rotation axis 42 of the lathe 30 can be tilted to about 15 degrees from the horizontal. The ability to tilt the lathe 30 allows the lathe rotation axis 42 to be aligned with the hub when the hub is tilted, as frequently occurs when the vehicle is lifted and the wheels no longer support the weight of the vehicle. One example of a structure for the coupling 40 which allows orienting and tilting the lathe 30 is discussed in greater detail below with regard to FIG. 4.

To mount the lathe 30 to the hub, the lathe rotation axis 42 is placed roughly in line with a hub axis (not shown) of the wheel hub about which the hub and the brake disk rotate. While the track 32 and the transverse path 36 allow moving the lathe 30 into position with respect to the hub in a horizontal plane, the relative height of the lathe rotation axis 42 in a vertical plane must be matched to the height of the hub axis of the brake disk to be machined. In this embodiment, such adjustment of the relative height of the lathe rotation axis 42 is achieved by the raising or lowering the carriages 24 of the lift 12 on which the vehicle is supported.

FIGS. 2–5 illustrate another embodiment of the present invention, an improved brake lathe station 100 having an on-vehicle brake lathe 102. The brake lathe station 100 again employs a lift 104; however, the lift 104 of this embodiment employs only a single support post 106. The support post 106 is similar in operation to the support posts 14 discussed above, but is designed to support a vehicle by itself.

Figure 2:
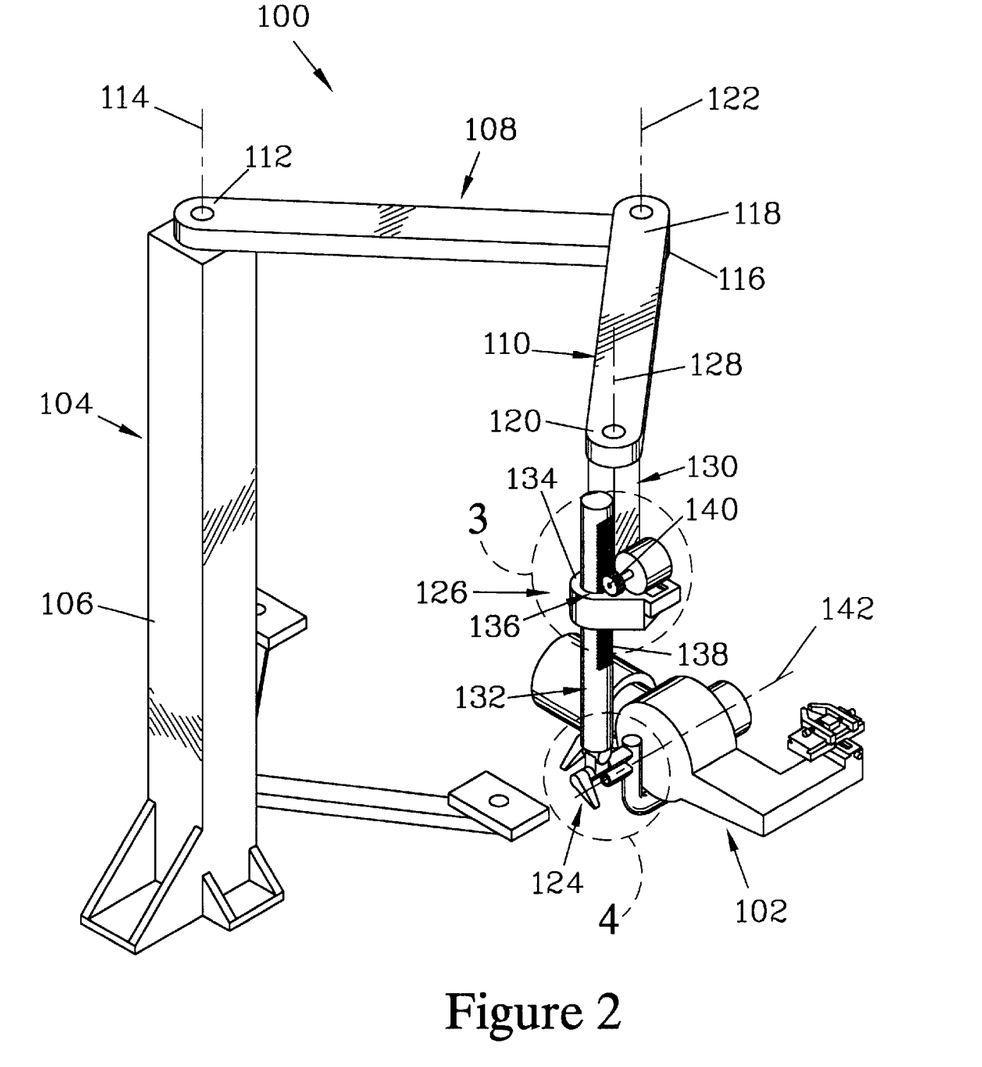

The brake lathe station 100 also differs in that the means for positioning the on-vehicle brake lathe 102 with respect to a horizontal plane does not employ a track, but rather employs a first lathe supporting arm 108 and a second lathe supporting arm 110. The first lathe supporting arm 108 terminates in a first arm base end 112, which is connected with respect to the lift 104 so as to rotate about a substantially vertical fixed pivot axis 114, and a first arm free end 116 (best shown in FIG. 5). The second lathe supporting arm 110 terminates in a second arm base end 118, which is pivotably connected to the first arm free end 116, and a second arm free end 120. The pivotable connection between the second arm base end 118 and the first arm free end 116 allows them to pivot with respect to each other about a substantially vertical arm pivot axis 122. Thus, it should be apparent that the first lathe supporting arm 108 is free to rotate in a substantially horizontal plane about the fixed pivot axis 114, while the second lathe supporting arm 110 is free to rotate in a substantially horizontal plane about the arm pivot axis 122, the position of which is adjusted as the first lathe supporting arm 108 is rotated. In the embodiment illustrated, the fixed pivot axis 114 is coincident with a longitudinal axis (not shown) of the support post 106.

In the brake lathe station 100, the on-vehicle brake lathe 102 is attached to the second lathe supporting arm 110 via a coupling 124 and a substantially vertical telescoping wand 126 which serves as a lathe brace. The coupling 124 is designed to fixably attach the lathe 102 to the telescoping wand 126, while allowing a range of adjustment of the orientation of the lathe 102 similar to that discussed above with regard to the coupling 40.

The telescoping wand 126 of this embodiment is pivotably attached to the second arm free end 120, so as to be rotatable with respect thereto about a wand pivot axis 128 which is substantially parallel to the fixed pivot axis 114 and the arm pivot axis 122. The motion of the first lathe supporting arm 108 and the second lathe supporting arm 110 are sufficient to allow the wand 126 to traverse a path which circumscribes the vehicle so that all disk brakes can be serviced without requiring the removal of the vehicle, while the pivotable connection of the wand 126 to the second arm free end 120 allows the lathe 102 to be turned to face the disk brake once the wand 126 is in the desired position.

The telescoping wand 126 has a first wand member 130, which is attached to the second arm free end 120, and a second wand member 132, which attaches to the coupling 124. The second wand member 132 is slidably engaged with a sleeve 134 on the first wand member 130, allowing the height of the lathe 102 to be varied. In this embodiment, a rack and pinion mechanism 136 is employed to adjust the height of the lathe 102. The telescoping wand 126 and the rack and pinion mechanism 136 provide, in combination, means for adjusting the position of the lathe 102 with respect to a vertical plane.

Figure 3:
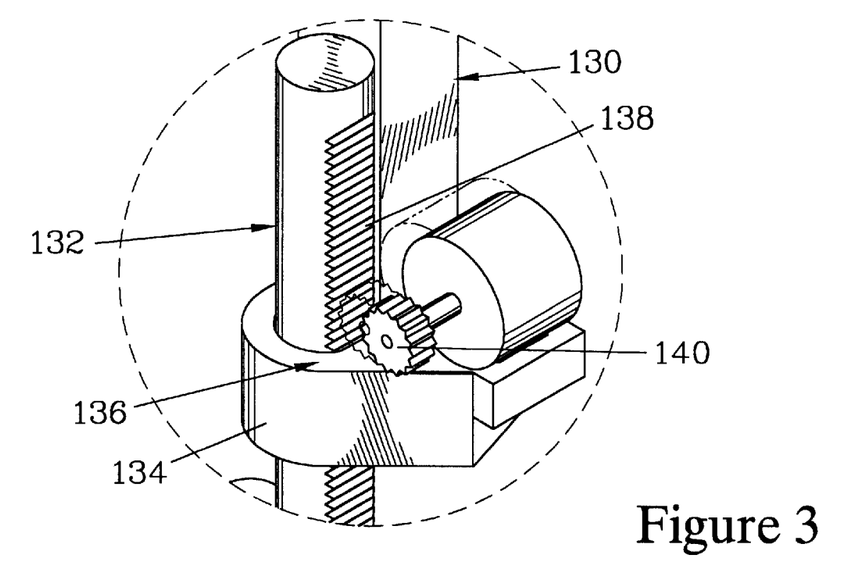

As better shown in FIG. 3, the rack and pinion mechanism 136 has a rack 138, which is formed on the second wand member 132, and a driven pinion gear 140, which is mounted to the first wand member 130 so as to be engagable with the rack 138 of the second wand member 132. The pinion gear 140 is preferably movable between a rack-engaging position, shown in FIG. 2, and a disengaged position, shown in FIG. 3. When the pinion gear 140 is in its rack-engaging position, it can be driven to move the rack 138 and the second wand member 132 vertically to adjust the height of the lathe 102, which is attached to the second wand member 132 by the coupling 124. This vertical adjustment allows the operator to readily match the height of the lathe 102 to a wheel hub to mount the lathe on the hub, without requiring use of the lift 104 to adjust the height of the vehicle.

Once the lathe 102 is mounted on the hub, it is supported by the hub while the disk brake associated with the hub is machined. During this lathe operation, it is desirable to float the lathe 102 with respect to the support arms (108, 110) to prevent vibrations transmitted through the support arms (108, 110) from interfering with the machining process. To achieve this, the pinion gear 140 is moved to its disengaged position shown in FIG. 3, where it is disengaged from the rack 138. When the pinion gear 140 is in the disengaged position, the second wand member 132 is free to slidably engage the sleeve 134 to reduce transmission of vibrations through the connection between the first wand member 130 and the second wand member 132. It should be noted that, while the lathe 102 floats when the pinion gear 140 is moved to its disengaged position, the lathe 102 is prevented from rotating about a lathe rotation axis 142 (shown in FIG. 2) by the stabilization of the second wand member 132 by the sleeve 134. When the operation of the lathe 102 is completed, the pinion gear 140 is returned to its rack-engaging position (shown in phantom in FIG. 3) before removing the lathe 102 from the hub.

Figure 4:
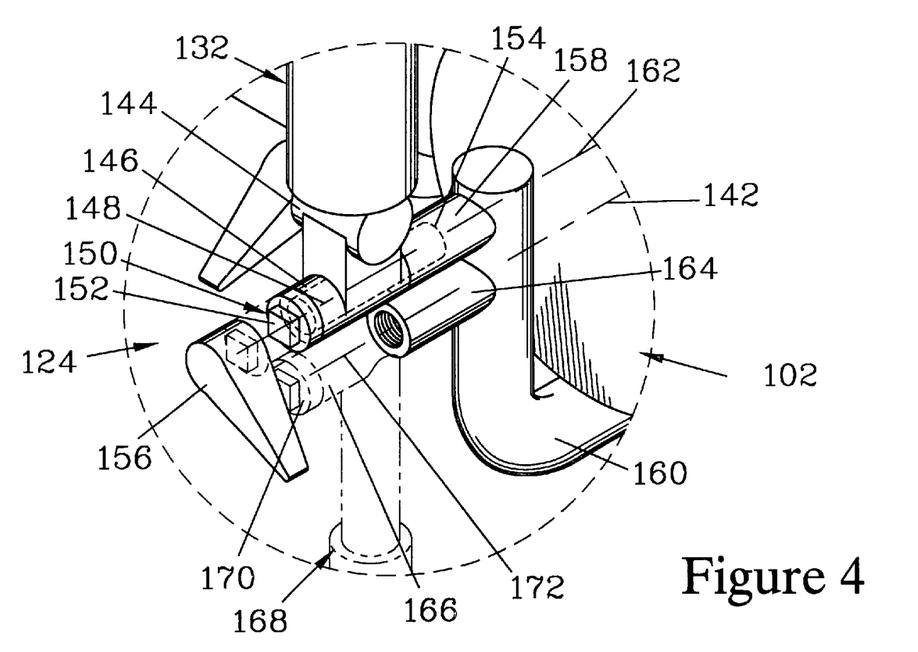
FIG. 4 is an enlarged view of the region 4 of FIG. 2, illustrating the dual-purpose coupling.

As pointed out above, the wand 126 is connected to the on-vehicle brake lathe 102 by the coupling 124. Details of the coupling 124 are shown in FIG. 4. The orientation of the coupling 124 can be readily adjusted to change the orientation of the lathe rotation axis 142 and to permit the on-vehicle brake lathe 102 to rotate about, or substantially about, the lathe rotation axis 142. The coupling 124 has a lockable knuckle 144 which attaches to the second wand member 132 and provides rotation in a substantially vertical plane. Attached to the lockable knuckle 144 is a conduit 146 having a conduit axis 148 which resides in the rotation plane of the lockable knuckle 144. An upper bolt 150, terminating in a bolt head 152 and a bolt free end 154, is configured to slidably engage the conduit 146. The bolt head 152 is configured to be engaged by a lever 156, while the bolt free end 154 can be threadably engaged with an upper bolt receptor 158. The upper bolt receptor 158 in turn is affixed to a lathe frame 160, to which the lathe 102 is affixed, and has an upper bolt receptor axis 162 which is parallel to and substantially aligned with the lathe rotation axis 142. When the upper bolt 150 is inserted and loosely threaded into the upper bolt receptor 158, the on-vehicle brake lathe 102 can be rotated about the upper bolt receptor axis 162, providing substantially axial rotation of the on-vehicle brake lathe 102. Once the appropriate rotation about the upper bolt receptor axis 162 has been made, further tightening of the upper bolt 150 brings the bolt head 152 and the upper bolt receptor 158 into forcible engagement with the conduit 146 such that it is locked in position.

Figure 5:
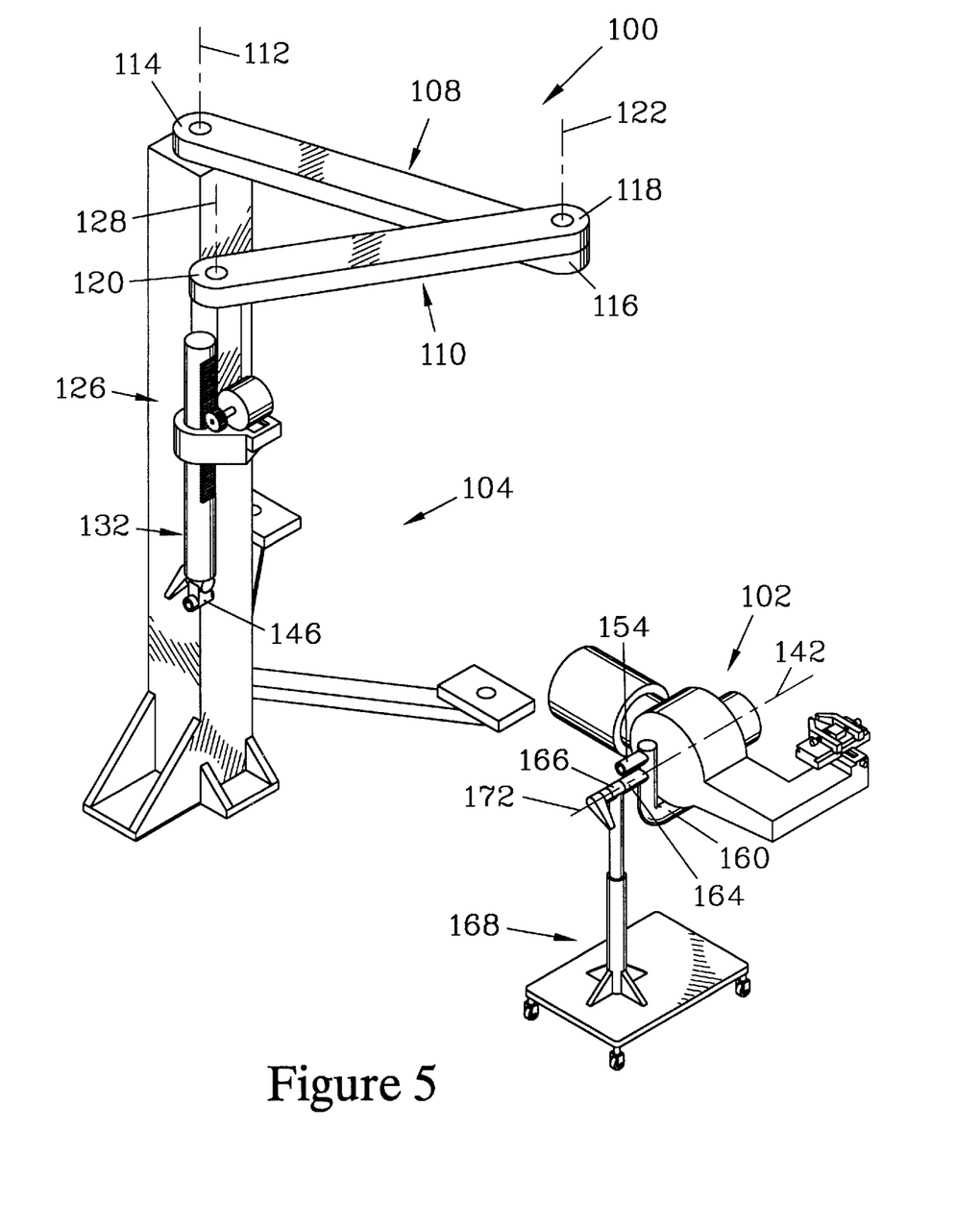
FIG. 5 is an isometric view of the embodiment shown in FIG. 2 where the on-vehicle lathe has been removed on a dolly and the wand is positioned in close proximity to the support post to avoid interference with other operations typically done on the lift.

A lower bolt receptor 164 is also affixed to the lathe frame 160. When the lower bolt receptor 164 is aligned with a dolly conduit 166 of a dolly 168 (shown in phantom), the lower bolt receptor 164 and the dolly conduit 166 can be engaged by a lower bolt 170 (also shown in phantom) which is inserted into the lower bolt receptor 164 and tightened by the lever 156 to secure the dolly 168 to the lathe frame 160. When the lower bolt 170 secures the dolly 168 to the lathe frame 160, the upper bolt 150 can be removed and the lathe 102 will be supported solely by the dolly 168, as shown in FIG. 5. To facilitate orienting the lathe 102 with a wheel hub while it is mounted on the dolly 168, it is preferred for the lower bolt receptor 164 to have a lower bolt receptor axis 172 which is aligned with the lathe rotation axis 142.

While the bolts (150, 170) illustrated are designed to be engaged by the lever 156, it should be appreciated by one skilled in the art that bolts could be employed which are formed with an integral lever forming part of the bolt head. In such cases, the rotation required to secure each bolt with its respective bolt receptor should be limited to prevent interference with the bolt head of the other bolt as the integral lever is turned. Such limited rotation could be achieved by providing a long bolt which is slidably engagable with a portion of the bolt receptor and only is threaded on the end, such that a portion of the bolt engages the bolt receptor to provide support before the threads are engaged, the threads being sufficiently coarse in pitch that only a limited rotation of the bolt is needed to fully engage the threads with the bolt receptor. An alternative structure to provide limited rotation is to provide a bayonet connection between the bolt free end and the bolt receptor, preferably where the surfaces of the bayonet connection which engage to retain the bolt free end in the receptor are inclined such that the bolt head is drawn into forcible engagement with the conduit through which the bolt passes as the lever is turned.

Figure 6:
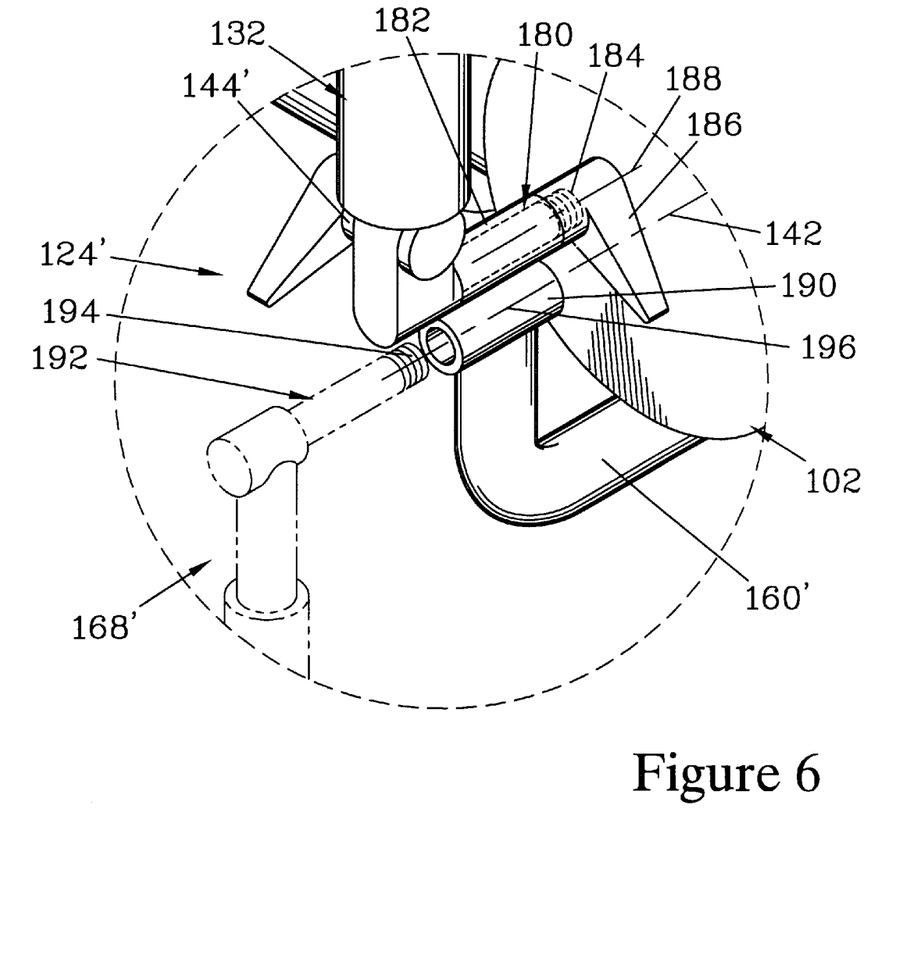
FIG. 6 is a detail view which corresponds to the view of FIG. 4, showing an alternative structure for a dual-purpose coupling.

FIG. 6 shows an alternative coupling 124' for connecting the on-vehicle brake lathe 102 to the second wand member 132. The coupling 124' again has a lockable knuckle 144', which in turn attaches to a pin 180. The pin 180 is configured to slidably engage an upper conduit 182 on a lathe frame 160', and terminates in a threaded end 184. The threaded end 184 extends from the upper conduit 182 when the pin 180 is slidably engaged therein, and may be threadably engaged by a lever nut 186. The lever nut 186 is then tightened to secure the lockable knuckle 144' of the coupling 124' to the lathe frame 160'. The upper conduit 182 has an upper conduit axis 188 which is parallel to and substantially aligned with the lathe rotation axis 142. When the pin 180 is inserted into the upper bolt conduit 182, the on-vehicle brake lathe 102 can be rotated about the upper conduit axis 188, providing substantially axial rotation of the on-vehicle brake lathe 102. When the lathe is in the desired orientation, the lever nut 186 is engaged with the threaded end 184 of the pin 180 and tightened to lock the upper conduit 182 into position with respect to the lockable knuckle 144'.

A lower conduit 190 is also affixed to the lathe frame 160'. The lower conduit 190 is designed to be slidably engaged by a dolly pin 192 of a dolly 168' (shown in phantom). Once the dolly pin 192 is slid into the lower conduit 190, the lever nut 186 can be removed from the threaded end 184 of the pin 180 and thereafter threadably engaged with a threaded dolly pin end 194 of the dolly pin 192 and tightened to secure the dolly 168' to the lathe frame 160'. The pin 180 can then be slid out of the upper conduit 182 and the lathe 102 will be supported solely by the dolly 168'. To facilitate orienting the lathe 102 with a wheel hub while it is mounted on the dolly 168', it is preferred for the lower conduit 190 to have a lower conduit axis 196 which is aligned with the lathe rotation axis 142.

Figure 7:
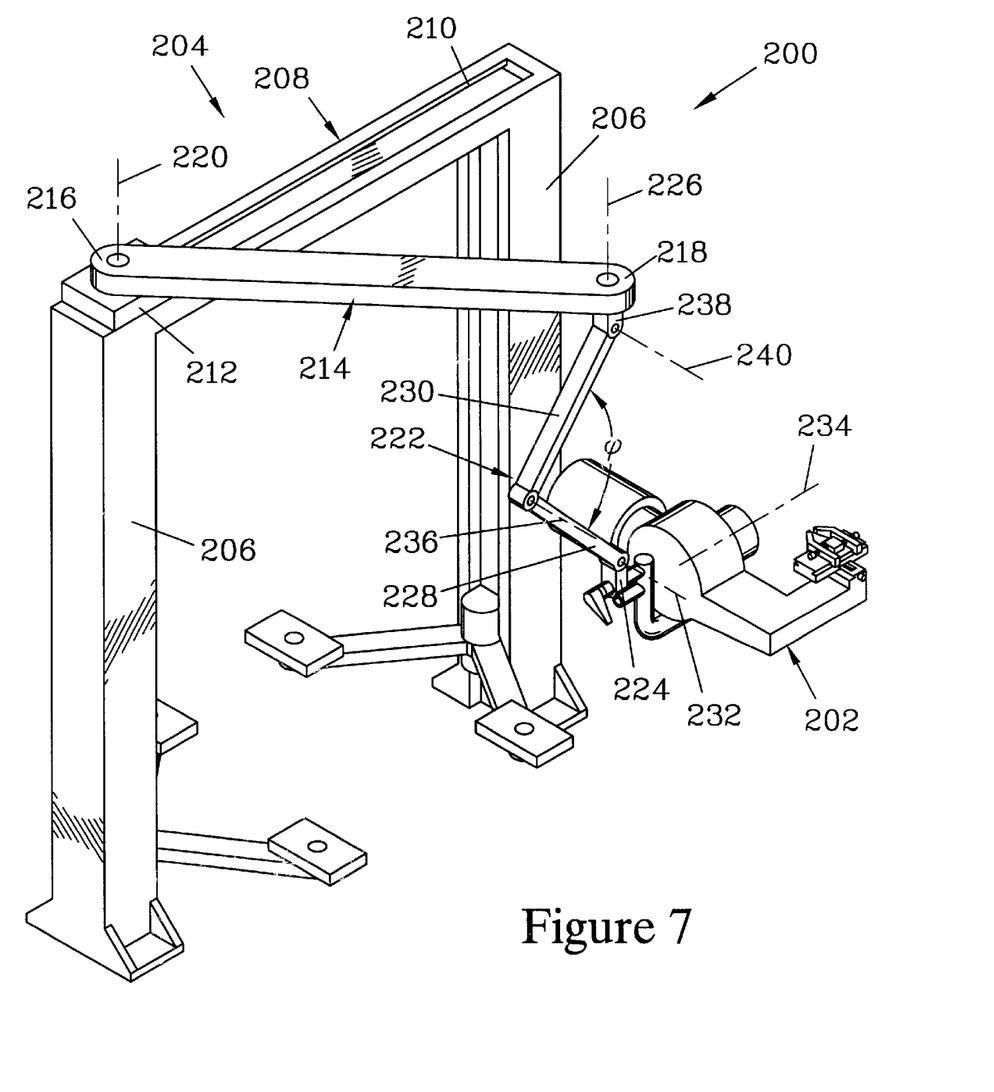
FIG. 7 is an isometric view of another embodiment of the present invention, which employs a lift having two support posts connected by a stabilizing bar. An arm carriage moves along a track which extends along the stabilizing bar, and a lathe supporting arm is pivotably attached to an arm carriage for horizontally positioning the lathe. The brake lathe station of this embodiment also employs a pair of lathe height adjusting arms which are connected to pivot about horizontal axes to provide means for adjusting the vertical position of the lathe.

FIG. 7 is an isometric view of another embodiment of the present invention, a brake lathe station 200. The brake lathe station 200 again has an on-vehicle brake lathe 202, and a lift 204. The lift 204 of this embodiment employs a pair of support posts 206, which are connected by a stabilizing bar 208.

In the brake lathe station 200, the stabilizing bar 208 is formed with a bar track 210 which extends substantially the length of the stabilizing bar 208. The bar track 210 is slidably engaged by an arm carriage 212 such that the arm carriage 212 is movable along the length of the bar track 210.

A lathe supporting arm 214 is provided, terminating in an arm base end 216 and an arm free end 218. The arm base end 216 is pivotably attached to the arm carriage 212 so as to rotate with respect to the arm carriage 212 about a substantially vertical arm pivot axis 220. The arm free end 218 is connected to a lathe brace 222, which in turn is connected to the lathe 202 via a coupling 224. In this embodiment, the combination of the bar track 210, the arm carriage 212, and the lathe supporting arm 214 provides the means for positioning the lathe 202 with respect to a horizontal plane to allow an operator to place the lathe 202 in close proximity to wheel hubs of a vehicle supported on the lift 204. The lathe brace 222 is pivotably connected to the arm free end 218 so as to be rotatable about a substantially vertical lathe pivot axis 226, allowing the lathe 202 to be turned to face the hub once the lathe 202 is in the desired position.

The lathe brace 222 of the brake lathe station 200 has a lower height adjusting arm 228 and an upper height adjusting arm 230. Preferably, the lower height adjusting arm 228 is pivotably connected to the coupling 224 so as to pivot about a substantially horizontal first adjustment axis 232. The pivotable connection of the lower height adjusting arm 228 and the coupling 224 allows tilting a lathe rotation axis 234 of the lathe 202, which is affixed to the coupling 224, so as to match the inclination of a wheel hub to which the lathe 202 is to be mounted. Preferably, the coupling 224 is fixably adjustable so as to also allow adjusting the orientation of the lathe 202 about or substantially about the lathe rotation axis 234 in the manner discussed above with respect to FIG. 4.

The lower height adjusting arm 228 in turn is pivotably connected to the upper height adjusting arm 230 such that the lower height adjusting arm 228 and the upper height adjusting arm 230 can pivot with respect to each other about a substantially horizontal height adjusting arm axis 236 to vary an included angle φ between the lower height adjusting arm 228 and the upper height adjusting arm 230. The included angle φ between the lower height adjusting arm 228 and the upper height adjusting arm 230 determines the vertical height of the lathe 202. The use of the lower height adjusting arm 228 and the upper height adjusting arm 230 as means for vertically positioning the lathe 202 facilitates mounting the lathe 202 to the hub in situations where the hub resides under a flared fender of the vehicle.

The lathe brace 222 preferably also includes a pivot link 238, which is pivotably connected to the upper height adjusting arm 230 so as to allow the operator to pivot the upper height adjusting arm 230, the lower height adjusting arm 228, and the lathe 202 about a substantially horizontal second adjustment axis 240. The pivotable connection of the upper height adjusting arm 230 to the pivot link 238 provides an additional degree of freedom in positioning the lathe 202 with respect to the hub. When the pivot link 238 is employed, it is pivotably connected to the arm free end 218 of the lathe supporting arm 214 so as to provide the rotation of the lathe brace 222 about the lathe pivot axis 226.

While the novel features of the present invention have been described in terms of particular embodiments and preferred applications, it should be appreciated by one skilled in the art that substitution of materials and modification of details obviously can be made without departing from the spirit of the invention.

What we claim is:

1. An improved brake lathe station for refinishing disk brakes while they remain affixed to hubs of a vehicle, each hub and associated disk having a common axis of rotation, the brake lathe station having, a lift having a first support post and a second support post, a vehicle undercarriage support associated with each of the first support post and the second support post and pivotally connected thereto and raisable thereon to raise the vehicle, an on-vehicle brake lathe attachable to one of the hubs of the vehicle for machining the brake disk associated therewith, and means for preventing rotation of the on-vehicle brake lathe relative to the axis of rotation of the hub and the disk brake, the improvement comprising:

horizontal positioning means for positioning the on-vehicle brake lathe with respect to a horizontal reference plane so as to bring the on-vehicle brake lathe in close proximity with one of the hubs to allow attachment thereto, said horizontal positioning means further comprising, a track fixed with respect to the first support post and the second support post, said track at least partially circumscribing the same a lathe brace slidably connected with respect to said track, and means for moving the lathe substantially normal to said track; and a coupling for attachment of the on-vehicle brake lathe with respect to said horizontal positioning means.

2. The improved brake lathe station of claim 1 wherein said horizontal positioning means further comprises:

a lathe carriage which slidably engages said track; and a transverse path on said lathe carriage along which said lathe brace moves, said transverse path being substantially normal to said track, thereby allowing said lathe brace to move substantially normal to said track.

3. An improved brake lathe station for refinishing disk brakes while they remain affixed to hubs of a vehicle, each hub and associated disk having a common axis of rotation, the brake lathe station having, a lift having at least one support post, a vehicle undercarriage support associated with each at least one support post and pivotally connected thereto and raisable thereon to raise the vehicle, an on-vehicle brake lathe attachable to one of the hubs of the vehicle for machining the brake disk associated therewith, and means for preventing rotation of the on-vehicle brake lathe relative to the axis of rotation of the hub and the disk brake, the improvement comprising:

horizontal positioning means for positioning the on-vehicle brake lathe with respect to a horizontal reference plane so as to bring the on-vehicle brake lathe in close proximity with one of the hubs to allow attachment thereto, said horizontal positioning means further comprising, a first lathe supporting arm having a first arm base end and a first arm free end, said first arm base end serving as a pivot point having a pivot axis which is fixed with respect to each of the at least one support posts, thereby providing pivoting motion in a horizontal plane, a second lathe supporting arm having a second arm base end and a second arm free end, said second arm base end being pivotally connected with respect to said first arm free end of said first lathe supporting arm so as to provide pivotal motion in the horizontal plane, a lathe brace connected to said second arm free end of said second lathe supporting arm, and means for rotating the lathe with respect to said second lathe supporting arm; and a coupling for attaching the on-vehicle brake lathe to said lathe brace.

4. The improved brake lathe station of claim 3 wherein said first arm base end is pivotally attached to one of the at least one support posts.

5. An improved brake lathe station for refinishing disk brakes while they remain affixed to hubs of a vehicle, each hub and associated disk having a common axis of rotation, the brake lathe station having, a lift having a first support post and a second support post, a vehicle undercarriage support associated with each of the first support post and the second support post and pivotally connected thereto and raisable thereon to raise the vehicle, an on-vehicle brake lathe attachable to one of the hubs of the vehicle for machining the brake disk associated therewith, and means for preventing rotation of the on-vehicle brake lathe relative to the axis of rotation of the hub and the disk brake, the improvement comprising:

horizontal positioning means for positioning the on-vehicle brake lathe with respect to a horizontal reference plane so as to bring the on-vehicle brake lathe in close proximity with one of the hubs to allow attachment thereto, said horizontal positioning means further comprising, a stabilizing bar attached to the first support post and the second support post, an arm carriage slidably engaging said stabilizing bar, a lathe supporting arm pivotally engaged with said arm carriage, and a lathe brace pivotably engaging said lathe supporting arm; and a coupling for attaching said lathe brace to the on-vehicle brake lathe.

6. An improved brake lathe station for refinishing disk brakes while they remain affixed to hubs of a vehicle, each hub and associated disk having a common axis of rotation, the brake lathe station having, a lift having at least one support post, a vehicle undercarriage support associated with each at least one support post and pivotally connected thereto and raisable thereon to raise the vehicle, an on-vehicle brake lathe attachable to one of the hubs of the vehicle for machining the brake disk associated therewith, and means for preventing rotation of the on-vehicle brake lathe relative to the axis of rotation of the hub and the disk brake the improvement comprising:

horizontal positioning means for positioning the on-vehicle brake lathe with respect to a horizontal reference plane so as to bring the on-vehicle brake lathe in close proximity with one of the hubs to allow attachment thereto, said horizontal positioning means being mounted such that at least one point of said horizontal positioning means is fixed with respect to the at least one support post;

a coupling for attachment of the on-vehicle brake lathe with respect to said horizontal positioning means, said coupling being detachable to allow removing the on-vehicle brake lathe from connection with said horizontal positioning means, said coupling further comprising:

means for connecting the on-vehicle brake lathe to a dolly for transporting the on-vehicle brake lathe to and from the brake lathe station, said means for connecting being configured to allow connecting the on-vehicle brake lathe to the dolly while the on-vehicle brake lathe is still connected to said horizontal positioning means.

7. The improved brake lathe station of claim 1 wherein said coupling is lockably adjustable so as to allow tilting the lathe to tilt a lathe rotation axis of the lathe with respect to the vehicle and to allow adjusting orientation of the lathe about its lathe rotation axis.

8. The improved brake lathe station of claim 7 further comprising:

vertical positioning means for positioning the on-vehicle brake lathe with respect to a vertical reference plane.

9. The improved brake lathe station of claim 1 further comprising:

means for floating the on-vehicle brake lathe with respect to said horizontal positioning means when the lathe is mounted to the hub, thereby damping vibrations from the environment.

10. The improved brake lathe station of claim 3 wherein said coupling is lockably adjustable so as to allow tilting the lathe to tilt a lathe rotation axis of the lathe with respect to the vehicle and to allow adjusting orientation of the lathe about its lathe rotation axis.

11. The improved brake lathe station of claim 10 further comprising:

vertical positioning means for positioning the on-vehicle brake lathe with respect to a vertical reference plane.

12. The improved brake lathe station of claim 3 further comprising:

means for floating the on-vehicle brake lathe with respect to said horizontal positioning means when the lathe is mounted to the hub, thereby damping vibrations from the environment.

13. The improved brake lathe station of claim 5 wherein said coupling is lockably adjustable so as to allow tilting the lathe to tilt a lathe rotation axis of the lathe with respect to the vehicle and to allow adjusting orientation of the lathe about its lathe rotation axis.

14. The improved brake lathe station of claim 13 further comprising:

vertical positioning means for positioning the on-vehicle brake lathe with respect to a vertical reference plane.

15. The improved brake lathe station of claim 5 further comprising:

means for floating the on-vehicle brake lathe with respect to said horizontal positioning means when the lathe is mounted to the hub, thereby damping vibrations from the environment.

16. The improved brake lathe station of claim 6 wherein said coupling is lockably adjustable so as to allow tilting the lathe to tilt a lathe rotation axis of the lathe with respect to the vehicle and to allow adjusting orientation of the lathe about its lathe rotation axis.

17. The improved brake lathe station of claim 16 further comprising:

vertical positioning means for positioning the on-vehicle brake lathe with respect to a vertical reference plane.

18. The improved brake lathe station of claim 6 further comprising:

means for floating the on-vehicle brake lathe with respect to said horizontal positioning means when the lathe is mounted to the hub, thereby damping vibrations from the environment.

* * * * *